United States Patent [19]

Kitamura

[11] Patent Number: 5,028,913
[45] Date of Patent: Jul. 2, 1991

[54] ANGLE ADJUSTING DEVICE IN DISPLAY DEVICE

[75] Inventor: Yoshiharu Kitamura, Komagane, Japan

[73] Assignee: NHK Spring Co., Ltd., Yokohama, Japan

[21] Appl. No.: 359,883

[22] Filed: Jun. 1, 1989

[51] Int. Cl.$^5$ ............................................. G09G 3/02
[52] U.S. Cl. ................................. 340/711; 188/77 W; 248/284; 248/917; 248/919; 340/700
[58] Field of Search .................... 400/83, 88, 472; 248/917, 918, 919, 920, 921, 922, 923, 284, 291; 340/700, 711; 16/342, 307, 85, 306; 364/707, 708; 358/229; 188/77 W; 200/573, 574, 61.62, 61.7, 61.58 R; 235/145 R; 267/155, 275; 220/264, 335

[56] References Cited

U.S. PATENT DOCUMENTS

| | | | |
|---|---|---|---|
| 3,542,160 | 11/1970 | Sacchini | 188/77 W |
| 4,264,962 | 4/1981 | Kodaira | 364/707 |
| 4,373,122 | 2/1983 | Frame | 340/711 |
| 4,438,458 | 3/1984 | Münscher | 340/700 |
| 4,683,465 | 6/1987 | Lake, Jr. et al. | 340/700 |
| 4,739,316 | 4/1988 | Yamaguchi et al. | 340/711 |
| 4,742,478 | 5/1988 | Nigro, Jr. et al. | 364/708 |
| 4,808,017 | 2/1989 | Sherman et al. | 400/83 |
| 4,830,151 | 5/1989 | Numata | 16/85 X |
| 4,859,092 | 8/1989 | Makita | 248/923 |
| 4,870,604 | 9/1989 | Tatsuno | 364/708 |
| 4,878,123 | 10/1989 | Miura et al. | 358/401 |
| 4,960,256 | 10/1990 | Chihara | 248/917 X |

Primary Examiner—Ulysses Weldon
Assistant Examiner—Eric Frahm
Attorney, Agent, or Firm—Fleit, Jacobson, Cohn, Price, Holman & Stern

[57] ABSTRACT

An angle adjusting device for a display device includes a fixed axis and a rotatable axis of the same diameter fixed on a display and a main body. The axes coaxially abut each other, and a coil spring is closely wound on the abutting portions of the axes. An end of the spring abuts a step portion of the fixed axis and the other end abuts an operating piece integrally provided on the rotatable axis when the display is open in vertical position. Opening energy is stored in the coil spring when the display is folded into the main body so as to open up the display automatically when unlocked. An angle adjusting operation is performed arbitrarily by an operator by using the friction between the coil spring and the rotatable axis.

8 Claims, 6 Drawing Sheets

ANGLE ADJUSTING DEVICE IN DISPLAY DEVICE

BACKGROUND OF THE INVENTION

This invention relates to an angle adjusting device with a cam switch for a display of an electronic device such as a personal computer, word a processor or the like.

In such a device, the indications of programs and data are performed by displays such as a C R T (cathode-ray tube) display and the like. The display is adapted to be attached to a main body so that an angle adjustment is possible to facilitate an operator's visual observation. Accordingly, a device for angle adjustment of a display is incorporated therein. As such a device, a rachet mechanism has been used. However, in a device wherein such a rachet mechanism is used, the adjustment thereof is performed step by step, and a fine adjustment is impossible. Accordingly, such a device necessitates a large attaching space. Further, in the case of a construction in which the display folds into a main body, it is necessary to open up the display from a folded state to standing up state. Accordingly, in order to make a so called "a jumping system," which stands up automatically, another energized means, such as gas spring, spring or the like is necessary, which complicates the construction of the device.

A first object of this invention is to provide an angle adjustment device which permits stepless angle adjustment of the display from a standing up state automatically.

A second object of this invention is to provide an angle adjustment device which makes the display device stand up automatically from a folded state.

A third object of this invention is to provide an angle adjustment device which enables minimization and simplification of the structure thereof by performing the automatic standing up and the angle adjustment of the display with a spring.

A fourth object of this invention is to provide an angle adjustment device which can stop automatic standing up of the display of the display device at a predetermined angle.

A fifth object of this invention is to provide an angle adjustment device which is simple to assemble and easy to attach to the display device.

A sixth object of this invention is to provide an angle adjustment device which performs an on off switching action when the display is opened and fold.

SUMMARY OF THE INVENTION

This invention is provided with two axes which rotate relative to each other and a spring which locks the relative rotation of this two axes. One of the two axes is secured to the display, while another one is attached to the main body of the display, whereby a rotation energy for standing up of the display is stored in the spring by the rotation of display in the folding direction. Having this structure, the display stands up automatically until the friction force of the spring begins to work between the spring and the axes, and then, the stepless angle adjustment of the display can be performed by applying an outer force stronger than the friction force of the spring.

BRIEF DESCRIPTION OF THE DRAWINGS

The feature of this invention described above can be sufficiently understood by referring to the accompanying drawings.

In the figures, FIG. 1 (A) is a sectional view which shows an angle adjustment device according to a first example of this invention.

FIG. 1 (B), (C) and (D) are sectional views taken on line B—B, C—C and D—D respectively.

DETAILED DESCRIPTION OF THE PREFERRED EMBODIMENT

An angle adjustment device of the first example of this invention will be described according to FIG. 1 to FIG. 5.

Figure 1A:
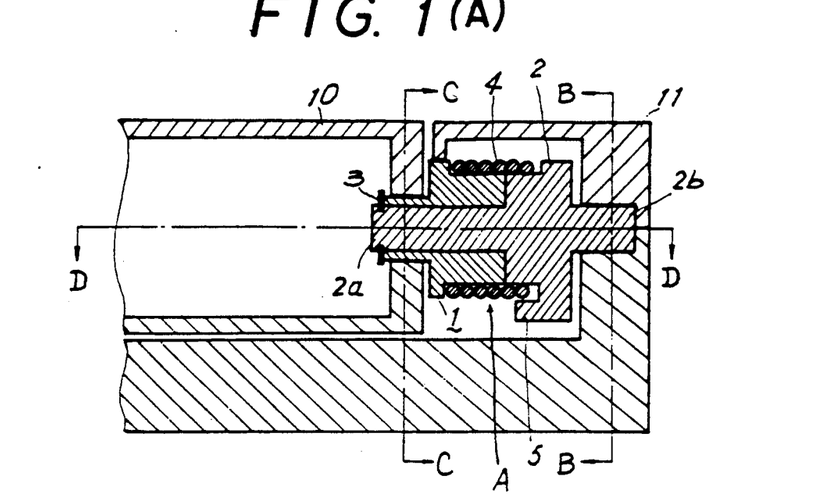
Figure 1B:
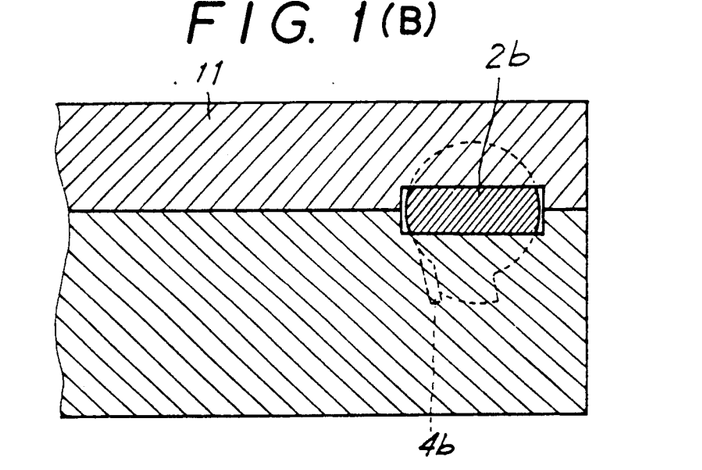
Figure 1C:
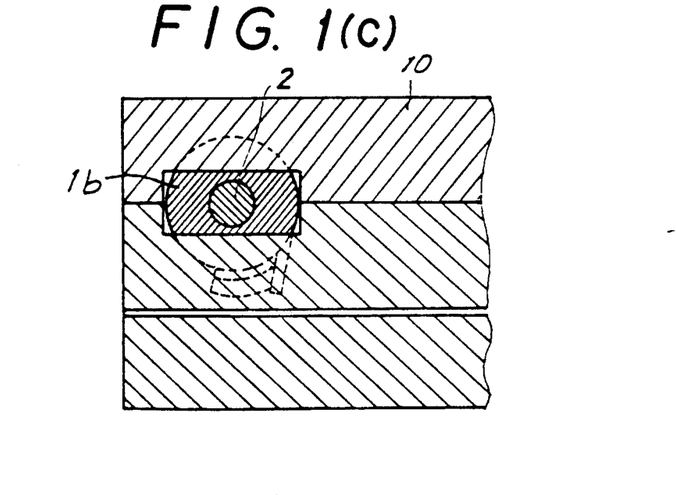
Figure 2:
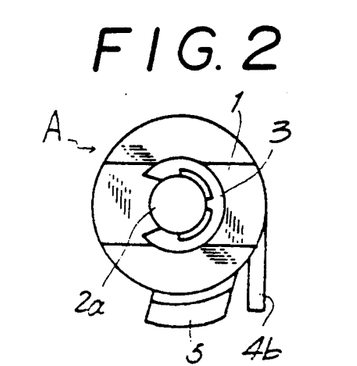
FIG. 2 is a side view, from the left side of the above angle adjustment device.
Figure 3:
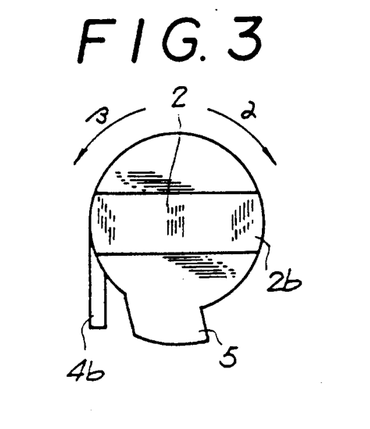
FIG. 3 is a side view, from the right side of the above angle adjustment device.
Figure 4:
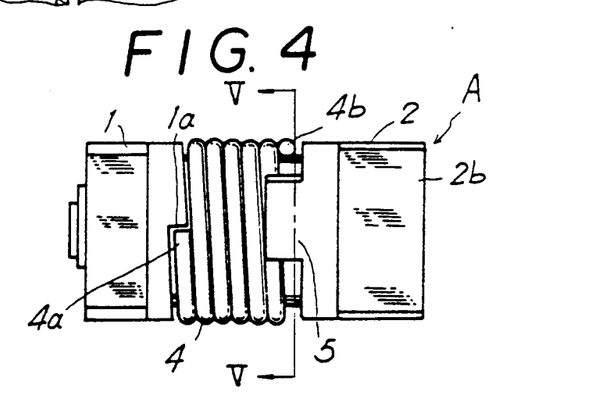
FIG. 4 is a front view of the above angle adjustment device.
Figure 5:
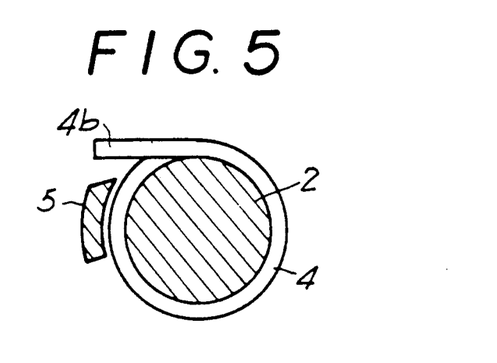
FIG. 5 is a sectional view taken on line V—V of FIG. 4.

In FIG. 1, numeral 10 is a display, 11 is a main body which supports the display 10, and A is an angle adjustment device. In FIG. 1, one axis is a fixed axis 2, while another axis is a rotatable axis 1. The angle adjustment device A consists of a fixed axis 2 wherein a cylindrical axis portion 2a extends from the left end side and a flat attaching piece 2b extends from right end side. The rotatable axis 1 has flat portion 1b wherein an axial portion 2a of the fixed axis is inserted coaxially, and a spring 4 which is externally inserted on the axes 1 and 2. The outer diameters of the rotatable axis 1 and of the fixed axis 2 are formed to have the dimensional diameter, respectively. The outer diameter portion is wound by the spring 4. The spring 4 comprises a coil spring, having a diameter formed somewhat smaller than the outer diameter. When the spring 4 is externally inserted on the axes, the insertion thereof is performed by enlarging the diameter of the coil. Accordingly, after the external insertion, the spring 4 clamps the axes 1 and 2 and the rotation of the rotatable axis 1 is locked by the friction force thereof. Further, the rotatable axis 1 is, as shown in FIG. 4, formed with a partial cutaway step portion 1a at the peripheral surface thereof and one end 4a of the spring 4 abuts this step-portion 1a. On the other hand, another end of the spring 4 forms a free end extending in a tangential direction of the coil portion. When the spring 4, is inserted externally on the axes, the windings of the coil on the rotatable axis 1 are larger in number than those on the fixed axis 2. Accordingly, the friction force of the spring with the rotatable axis 1 is larger than that with the fixed axis 2. By this, the angle adjustment of the display 10 becomes possible as described hereafter. In FIG. 4, the numeral 5 is an operating piece which engages with a free end 4b of the spring 4. The operating piece 5 of this example is integrally formed with the fixed axis 2 by extending a part of the fixed axis 2 outward and bending the extending portion in the spring 4 direction. The right end portion of the fixed axis 2 has a flat portion, thereby forming an attaching piece 2b to be fixed on the main body 11 which supports the display 10. Further, a snap ring 3 is inserted on the end portion 2a of the fixed axis 2.

Figure 6:
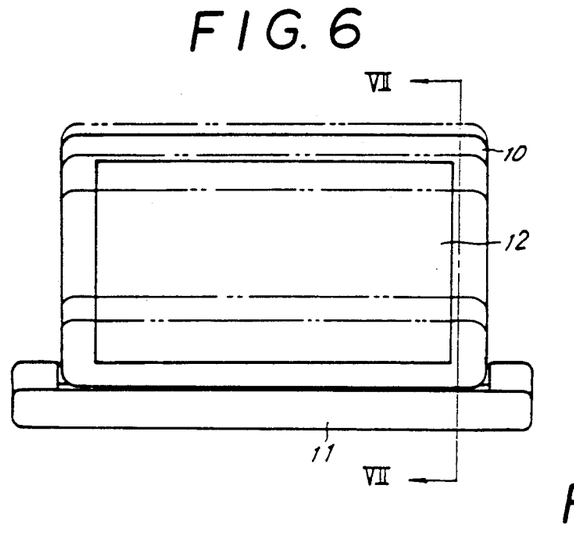
FIG. 6 is a front view of the display provided with an angle adjustment of this invention.
Figure 7:
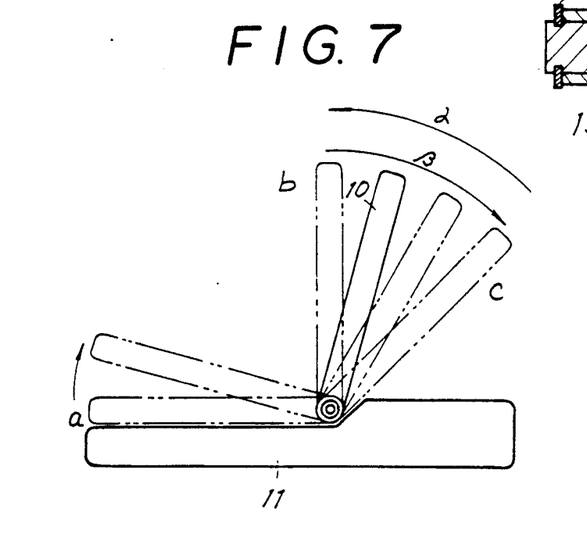
FIG. 7 is a sectional view taken on line VII—VII in FIG. 6.

On the other hand, the display device consists of the display 10 which visualizes data and image 12, and the main body 11, which supports the display 10. In this case, both ends of the lower portion of the display 10 are pivotally supported by the main body 11. By this, the display 10 is adapted to stand up against the main body 11. The angle adjustment device A is attached to this pivotally supported portion, thereby performing the jumping up and the angle adjustment of the display 10.

The operation of this example will be described as follows.

In a state wherein the display 10 is folded on the main body 11 (FIG. 7, Point a), the display 10 is energized in the standing up direction by the energy stored in the spring 4 as described hereafter. Accordingly, the folding state is maintained by a suitable locking mechanism which is not shown. When the display 10 opens up (FIG. 7, point b), the further rotation of the rotatable axis 1 is locked by the friction force due to the clamping force of the spring 4, thereby maintaining a stand up state of the display 10. Even though the display 10 is urged in the β direction (FIG. 7), the display 10 does not rotate when the operating force is smaller than the friction force of the spring 4 when the operating force is larger than the friction force of the spring 4, a slip occurs between the spring 4 and the fixed axis 2, permitting the rotatable axis 1 to rotate in the same direction (β direction shown by arrow in FIG. 3), thereby rotating the display 10. Since the slippage of this spring 4 occurs only on the fixed axis side 2 and does not occur on the rotatable axis side 1, the spring 4 rotates together with the fixed axis 1. This is because the number of the windings on the rotatable axis 1 is greater than that on the fixed axis 2 and the friction force of the spring 4 applied to the rotatable axis 1 is larger than that applied to the fixed axis 2. Thus, when the load is removed after a preferable relative to an operator is obtained, the rotation locking of the rotatable axis 1 is performed by the friction force and the display 10 is stopped at the inclined angle thereof, and thereby the angle adjustment is performed. Such angle adjustment can be performed within a movable range of the display 10 (range of point b to c in FIG. 7) expected by design thereof. However, since this adjustment is performed by the rotation of the rotatable axis 1, the non-step adjustment is possible, which facilitates a fine adjustment. Further, when the load in the reversal direction within a movable range (α direction in FIG. 7) is applied, the friction force due to the spring 4 decreases because this direction is a reversal direction against winding direction of the spring 4, whereby the operation of the display 10 can be performed with a small force. Then, in order to fold the display, i.e., to move it from point b in FIG. 7 to point a in FIG. 7, it is possible to continue to apply the load in the same direction to the display 10. Although the rotatable axis 1 rotates in the α direction, shown by an arrow in FIG. 3, accompanying the spring 4, a free end 4b of the spring 4 abuts against operating piece 5 formed at a fixed axis 2, whereby the free end 4b is urged. Since this direction is an anti-winding direction of the spring 4, the spring 4 is enlarged in diameter of the coil, and thereby energy for restoration is stored. At this time, one end of the spring 4 abuts against the step portion 1a of the rotatable axis 1 to restrict the rotation. In other words, in this state, the spring 4 acts as a torsion spring. Such energy becomes maximized in the folded state of the display 10. When the folding lock of the display is removed, the display 10 stands up automatically by the energy thereof. Accordingly, the display 10 is a jumping system. The jumping up of this display 10 is continued until the spring 4 clamps the rotatable axis 1 by discharging the energy storaged in the spring 4. By this, the display 10 is stopped near the point b in FIG. 7. Accordingly, in this example, a non-step angle adjustment of the display and the jumping becomes possible with a simple construction, thereby reducing the necessary mounting space.

Although in the above example, two axes were used as fixed and rotation axes 2 and 1, respectively, the opposite use thereof is also possible. In other words, the above fixed axis 2 can be used as a rotatable axis by attaching it to the display 10 and the rotatable axis 1 as a fixed axis by attaching it to the main body. In this case, at the time of the angle adjustment the slippage of the spring 4 occurs only at the rotatable axis side by the difference of numbers of winding in the spring 4, but does not occur at the fixed side. Accordingly, the spring 4 maintains a fixed state without any rotation.

Figure 8:
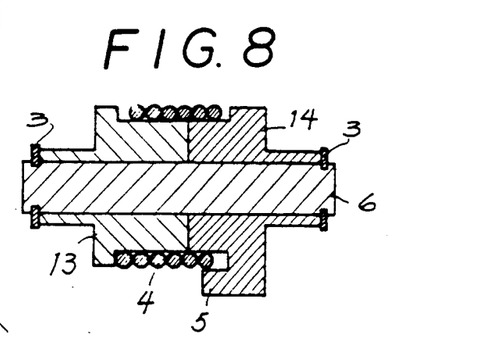
FIG. 8 is a sectional view showing a second example of this invention.
Figure 9:
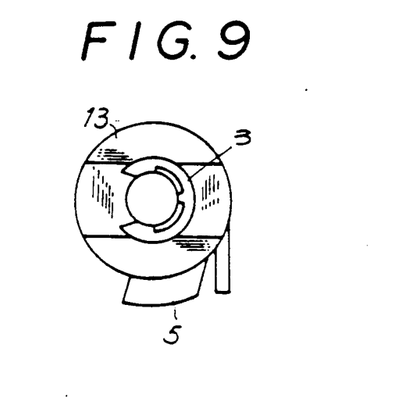
FIG. 9 is a side view of the example shown in the left side of FIG. 8.
Figure 10:
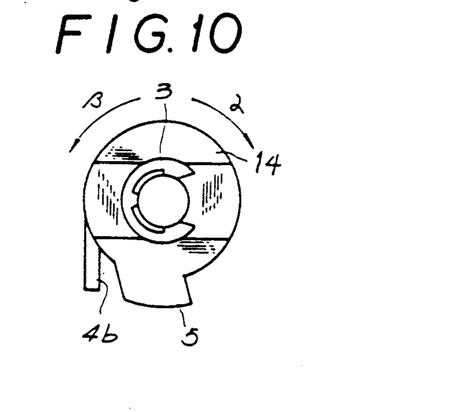
FIG. 10 is a side view of the example shown in the right side of FIG. 8.
Figure 11:
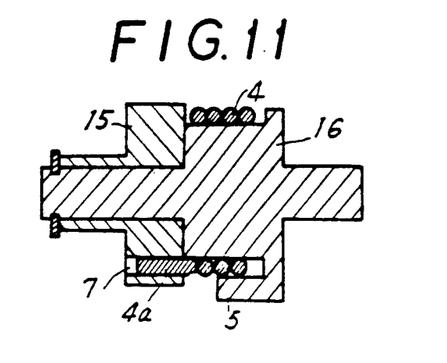
FIG. 11 is a sectional view which shows a third example of this invention.
Figure 12:
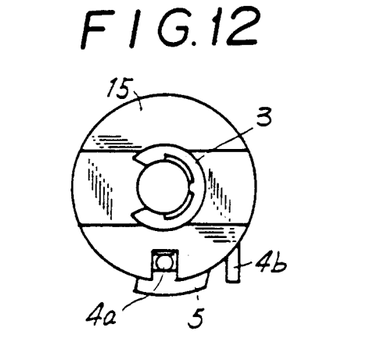
FIG. 12 is a side view of the example shown in the left side of FIG. 11.
Figure 13:
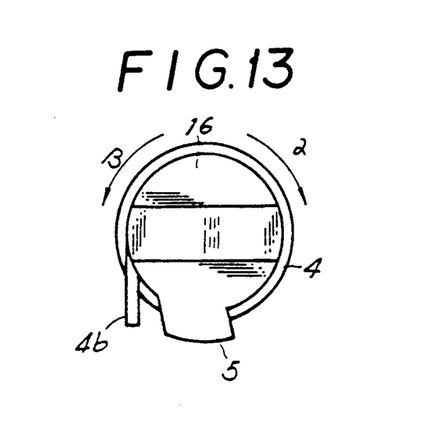
FIG. 13 is a side view of the example shown in the right side of FIG. 11.
Figure 14:
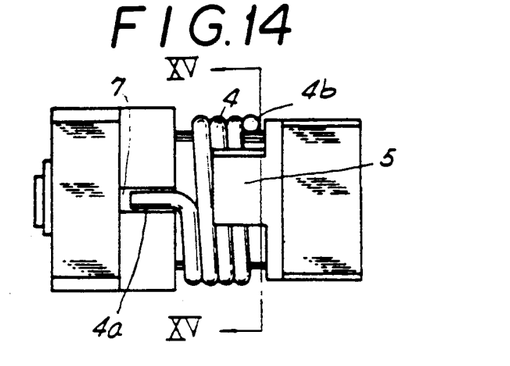
FIG. 14 is a front view of the example shown in FIG. 11.
Figure 15:
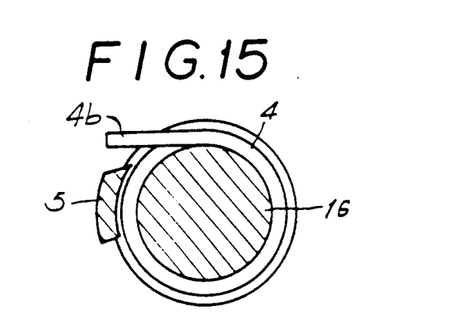
FIG. 15 is a sectional view taken on line XV—XV of FIG. 14.
Figure 16:
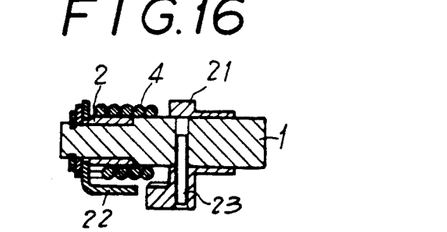
FIG. 16 is a sectional view which shows a fourth example of this invention.
Figure 17:
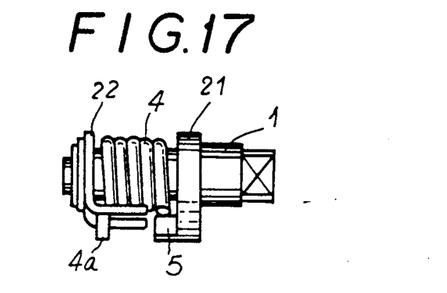
FIG. 17 is a front view of the example shown in FIG. 16.
Figures 18, 19, 21, 22:
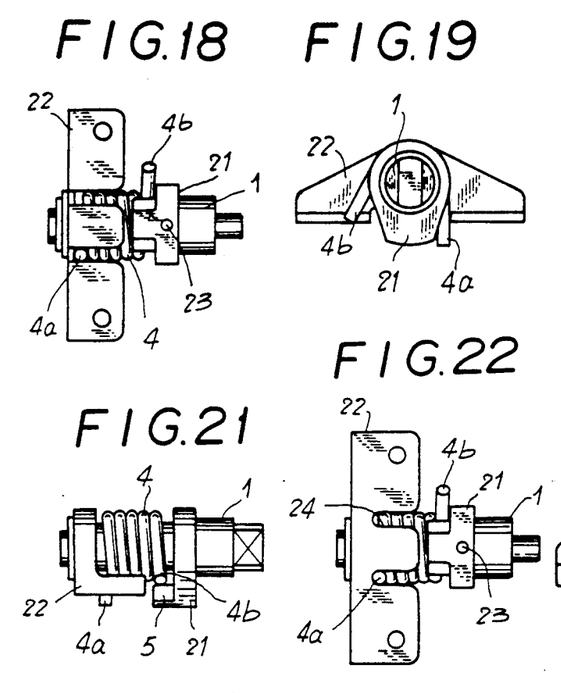
FIG. 18 is a bottom surface view of the example shown in FIG. 16.
FIG. 19 is a side view of the example shown in the right side of FIG. 16.
FIG. 21 is a front view of the example shown in FIG. 20.
FIG. 22 is a bottom surface view of the example shown in FIG. 20.
Figure 20:
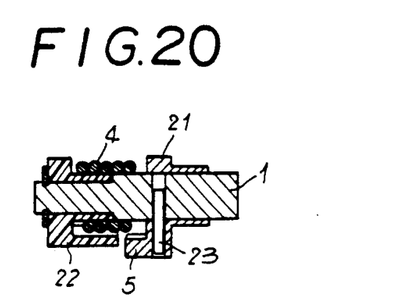
FIG. 20 is a sectional view which shows a fifth example of this invention.
Figure 23:
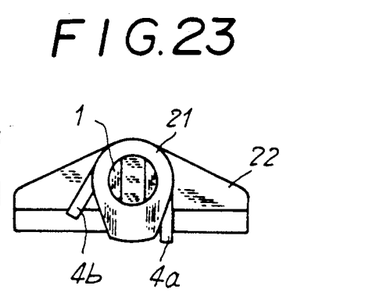
FIG. 23 is a side view of the example shown in the right side of FIG. 20.
Figure 24:
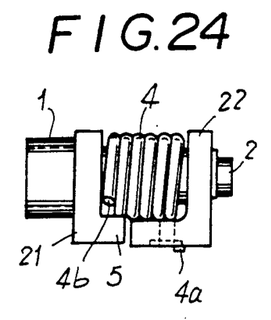
FIG. 24 is a front view which shows a sixth example of this invention.
Figure 25:
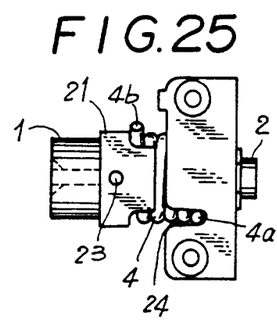
FIG. 25 is a bottom surface view of the example shown in FIG. 24.
Figure 26:
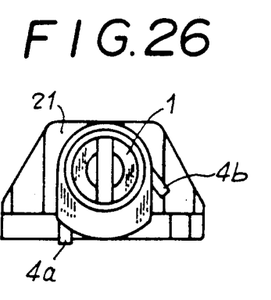
FIG. 26 is a side view of the example shown in the left side of FIG. 24.
Figures 27, 28:
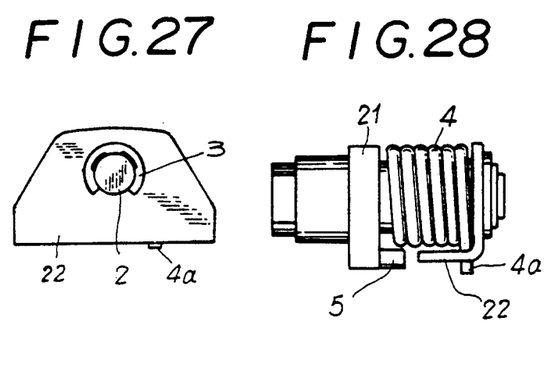
FIG. 27 is a side view of the example shown in the right side of FIG. 24.
FIG. 28 is a front view which shows a seventh example of this invention.
Figure 29:
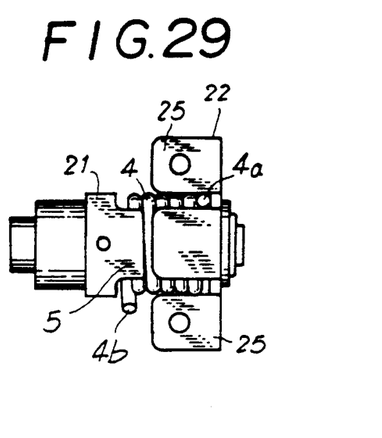
FIG. 29 is a bottom surface view of the example shown in FIG. 28.
Figure 30:
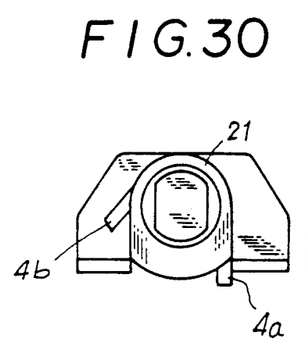
FIG. 30 is a side view of the example shown in the left side of FIG. 28.
Figure 31:
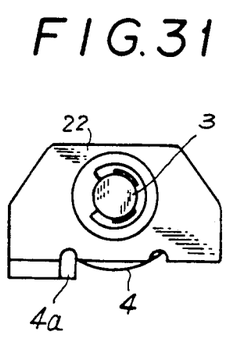
FIG. 31 is a side view of the example shown in the right side of FIG. 28.
Figure 32:
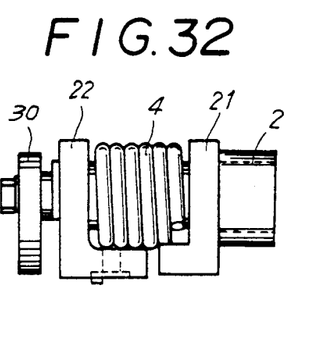
FIG. 32 is a front view which shows a eighth example of this invention.
Figure 33:
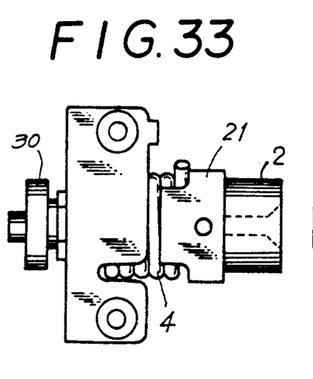
FIG. 33 is a bottom surface view of the example shown in FIG. 32.
Figure 34:
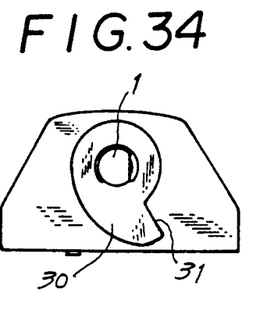
FIG. 34 is a side view of the example shown in the left side of FIG. 32.
Figure 35:
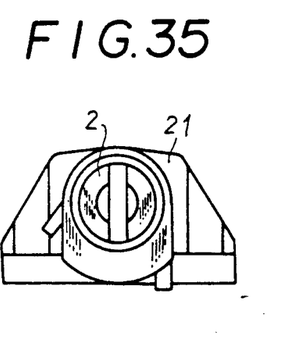
FIG. 35 is a side view of the example shown in the right side of FIG. 32.

FIG. 8 to FIG. 10 illustrate another example of this invention. In this example, two axes together form a fixed axis 13 attached to the main body 11 and a movable axis 14 attached to the display 10, respectively. In this example, through holes in the axial directions are formed to both fixed axis 13 and rotatable axis 14 respectively. Accordingly, each end portion of the fixed axis 13 and of the rotatable axis 14 is secured by the snap ring 3. In this example, since the rotatable axis 14 rotates around a center of a supporting axis 6, the same operation can be performed by assembling the spring 4 in the same way as in the above example.

FIG. 11 to FIG. 15 illustrate a third example of this invention. In this example, the two axes form a fixed axis 15 and a rotatable axis 16 respectively, as in the above example. In this example, the outer diameter of the fixed axis 15 is formed larger than that of the rotatable axis 16 and the spring 4 is externally inserted only on the rotatable axis 16. Further, at the outer surface of the fixed axis 15, a groove 7 is formed in the axial direction. Into the groove is inserted one end 4a of the spring 4. Accordingly, the rotation of the spring 4 is restricted and the slippage occurs on the rotatable axis 16 by the load in the winding direction. Further, when the operating piece 5 abuts the spring by the load in the anti-winding direction, the diameter of the coil is enlarged, and storage of the jumping energy of the display 10 becomes possible.

Further, also in the example in FIG. 8 to FIG. 15, the rotatable axes 14, 16 and the fixed axes 13, 15 can be respectively used for the fixed axes and the rotatable axes reversely as in the example of FIG. 1 to FIG. 7. The same operation can be obtained.

FIG. 16 to FIG. 19 illustrate the fourth example of this invention. In this example, the rotatable arm 21 is secured together to the rotatable axis 1, and spring pin 23 is inserted thereinto to prevent relative turning. The left end portion of the rotatable axis 1 is of small diameter, said small diameter portion being inserted into the fixed axis 2. Both outer diameters of the fixed axis 2 and the rotatable axis 1 are of the same size and the spring 4 is externally inserted on the outer surfaces thereof in a tightly closed state. The fixed axis 21 is, as shown in FIG. 22, supported by a bearing 22 having a slit 24 in a parallel direction to the axial direction. The bearing 22 is adapted to be attached to the display 10 or the main body 11, said bearing 22 facilitating the attaching of the display to the display device. One end 4a of the spring 4 is inserted in the slit 24 of the bearing 22 whereby the turning of the spring is prevented. Further, the rotatable arm 21 is integrally formed with the operating piece 5 and another end 4b of the spring 4 is free thereby abutting on the operating piece.

FIG. 20 to FIG. 23 indicate a fifth example according to this invention. The fifth example has approximately the same structure as the fourth example. Accordingly, though the description of duplicated parts in both examples is omitted, the fixed axis 2 and the bearing 22 are formed integrally. Namely, the fixed axis 2 and the bearing are integrally formed with plastics. This construction has a merit in that it enables a decrease in the number of parts and the weight thereof.

FIG. 24 to FIG. 27 indicate the sixth example of this invention. In the sixth example, the rotatable arm 21 is also secured to the rotatable axis 1 with spring pin 23 in a state wherein the turning of the rotatable arm 21 is prevented, while the fixed axis 2 is supported by the bracket 22. Although one end 4a of the spring 4 is inserted into the slit 24 of the bearing 22, the occurrence of the friction noise caused by the contact with the one end 4a of the spring 4 is prevented because the bearing is made of plastics.

FIG. 28 to FIG. 31 indicate the seventh example of this invention. Although the seventh example is constituted approximately the same as the sixth example, the bearing 22 is not integrated with the fixed axis 2 and a leg 25 for positioning is formed at a portion of the bearing 22. The leg 25 performs a relative positioning when the angle adjustment device is secured to the display and the main body thereof. By this, the positioning the attaching angle thereof can be correctly obtained.

FIG. 32 to FIG. 35 indicate the eighth example of this invention. As an internal structure of the fixed axis 2 and the rotatable axis 1 in this example, for instance, those shown in FIG. 11 to FIG. 15 are used. In other words, the rotatable axis 1 is inserted into the fixed axis 2, the left end portion of said rotatable axis 1 extending outward from the fixed axis 2. Further, the rotatable arm 21 is attached on the right side of the rotatable axis 1. A D-cut is provided on the left end portion extended from the fixed axis 2 and a switch cam 30 is engaged thereto. A cam surface 31 of the switch cam 30 is extended in a diameter direction thereof, said cam surface 31 switching on or off of the display 10. In other words, in this example, the switch cam 30 is attached so as to abut on the switch of the display device at the time of installing thereof. When the rotatable axis 1 rotates, the switch cam 30 is also integrally rotated, whereby the cam surface 31 comes into contact with switch. By this contact, the switching on or off in the display device is performed automatically. In such switching, it is desirable that the switch is on when the display 10 stands up automatically (i.e., when the display moves to a point corresponding to point b in FIG. 7) from the main body 11 due to the spring 4, and that the switch is off when the display 10 is folded on the main body 11 (i.e., when the display moves to a point corresponding to point a, in FIG. 7). By engaging such switch cam 30, automatic switching of the display 10 can be performed when the display 10 stands up and is folded down, thereby improving the operation system.

What I claim is:

1. An angle adjusting device for a display device rotatably supported by a main body for movement between a folded position, an intermediate position, and a fully open position, comprising:
   a pair of axes, each of said axes being fixed coaxially to one of the main body and the display device, ends of both axes abutting and being rotatable relative to each other;
   a coil spring closely and externally disposed about an outer surface of at least one of the axes, one end of the spring secured to the other of the axes, the other end of said spring being a free end; and an operating piece, formed on one of said axes, disposed adjacent the free end of the coil spring, the operating piece abutting the free end of the coil spring and working to store rotational energy in the coil spring when the display device is rotated, relative to the main body, into said folded position, the display device standing up automatically between said folded position and said intermediate position and then being arbitrarily adjustable between said intermediate position and said fully open position against a friction force applied by the coil spring between the coil spring and the outer surface of the at least one of the axes.

2. An angle adjusting device for a display device according to claim 1, wherein opposite ends of the axes have flat portions provided thereon for being fixed directly to one of the display device and the main body.

3. An angle adjusting device for a display device according to claim 1 wherein the coil spring is closely and externally disposed about only one of the axes.

4. An angle adjusting device for a display device according to claim 1 wherein the spring is closely and externally disposed about both of said axes.

5. An angle adjusting device for a display device according to claim 1 wherein either axis of the pair of axes is supported by a bracket secured to one of the display and the main body.

6. An angle adjusting device for a display device according to claim 5 wherein one end of the spring is latched to the bracket which supports one of said axes, the other end thereof forming said free end.

7. An angle adjusting device for a display device according to claim 1, and further comprising a switch cam for switching on when the display device stands up automatically and switching off when the display device is rotated relative to the main body into said folded position.

8. An angle adjusting device for a display device according to claim 1 wherein an axial portion for insertion into another axis is formed on one axis of the pair of axes.

* * * * *